Aug. 18, 1936.  C. L. COOK  2,051,162
IMPLEMENT FRAME CONSTRUCTION
Original Filed July 14, 1934  2 Sheets—Sheet 1
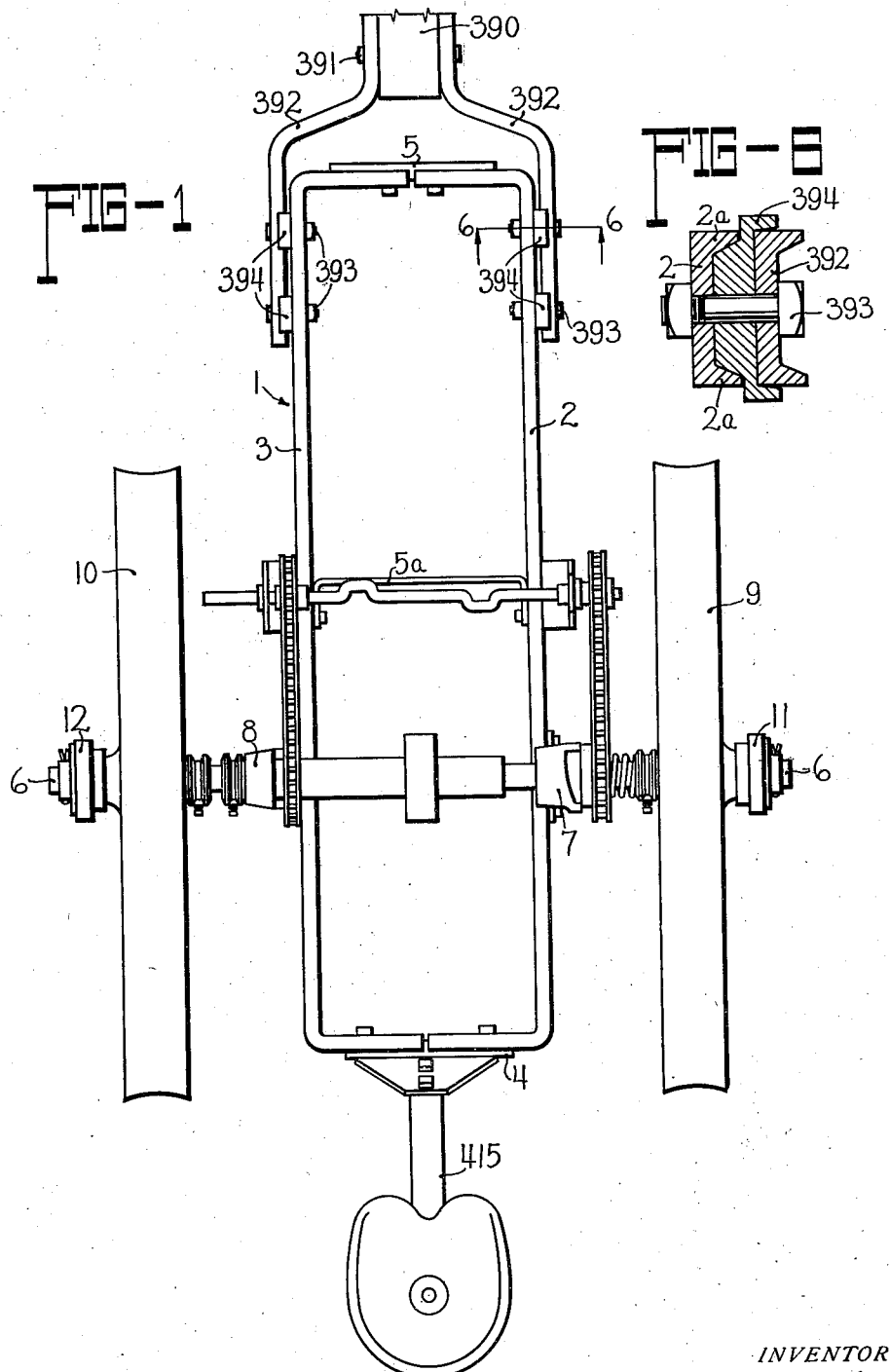
INVENTOR
Curtiss L. Cook
BY
Brown, Jackson, Boettcher + Dienner
ATTORNEYS.

Aug. 18, 1936.    C. L. COOK    2,051,162
IMPLEMENT FRAME CONSTRUCTION
Original Filed July 14, 1934    2 Sheets-Sheet 2
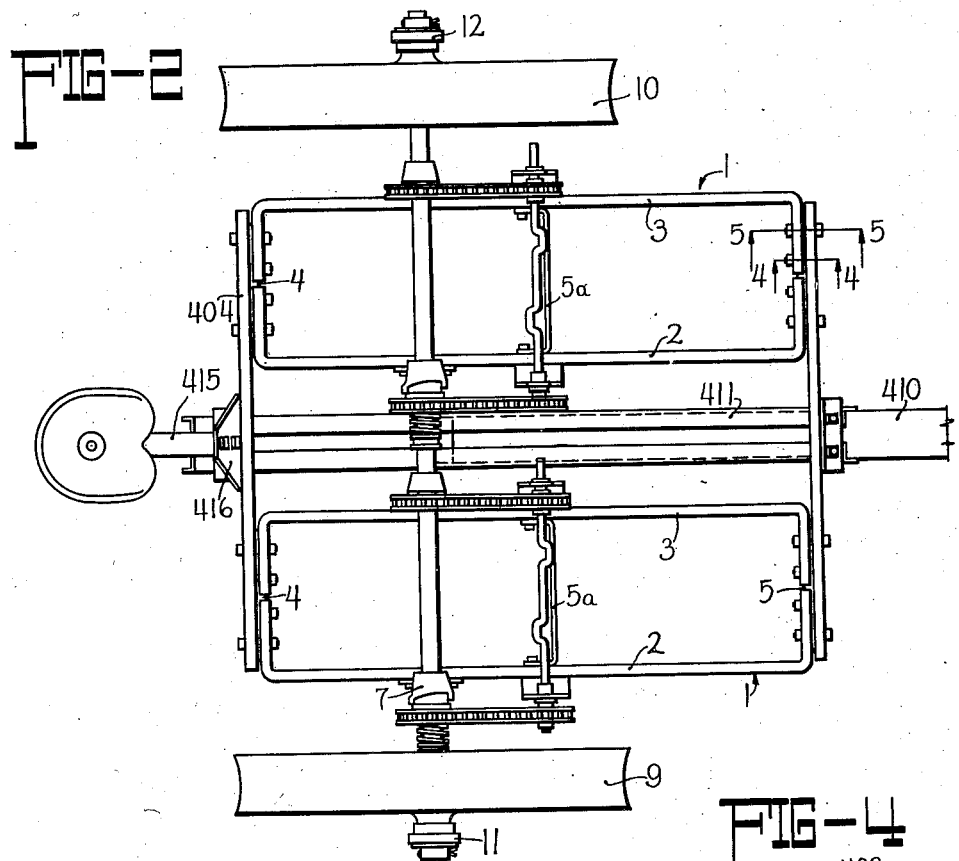
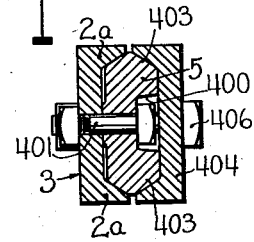
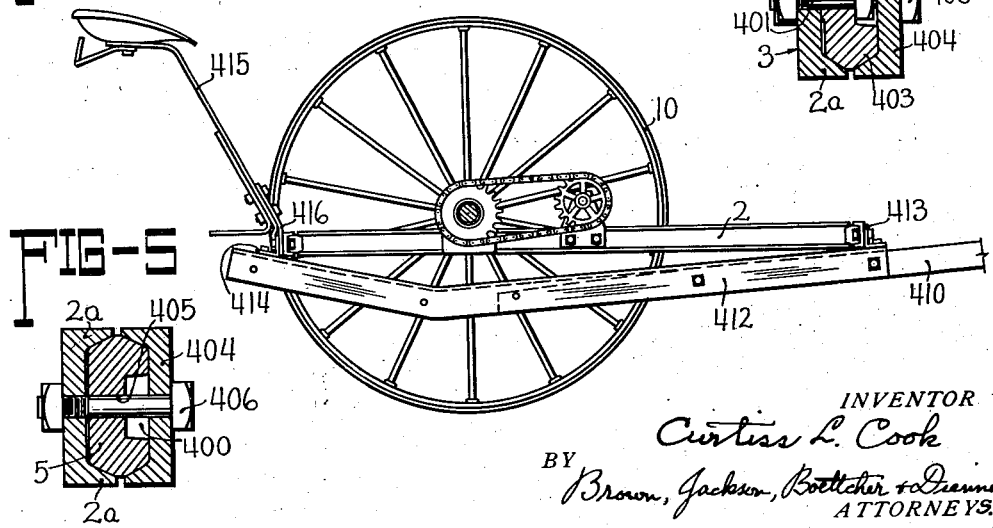
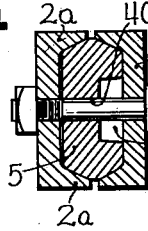
INVENTOR
Curtiss L. Cook
BY Brown, Jackson, Boettcher + Dienner
ATTORNEYS.

Patented Aug. 18, 1936

2,051,162

UNITED STATES PATENT OFFICE 2,051,162

IMPLEMENT FRAME CONSTRUCTION

Curtiss L. Cook, Syracuse, N. Y., assignor to Syracuse Chilled Plow Co., Inc., Syracuse, N. Y., a corporation of New York Original application July 14, 1934, Serial No. 735,135. Divided and this application April 24, 1935, Serial No. 17,906

10 Claims. (Cl. 280—106)

This application is a division of my copending application Serial No. 735,135, filed July 14, 1934.

The present invention relates generally to agricultural machines and implements, and the principal object of the present invention is the provision of new and improved frame means whereby two single-unit machines may easily and quickly be combined into a two-unit machine.

Specifically, a further object of the present invention is the provision of an improved agricultural implement frame means which comprises a frame unit suitably connected together by means which maintains the unit parts rigidly connected together and which, at the same time, provides for the association of a plurality of such units secured together and forming a relatively rigid frame construction for a multiple-row machine.

These and other objects and advantages of the present invention will be apparent to those skilled in the art after a consideration of the following detailed description of the preferred structural embodiment, taken in conjunction with the accompanying drawings illustrating the same.

In the drawings:

Figure 1 is a plan view of the framework of a single unit machine;

Figure 2 is a similar view showing the framework of an implement which is constructed of two frame units of the type shown in Figure 1;

Figure 3 is a side elevation of the implement parts shown in Figure 2;

Figure 4 is a section taken along the line 4—4 of Figure 2;

Figure 5 is a section taken along the line 5—5 of Figure 2; and

Figure 6 is a section taken along the line 6—6 of Figure 1.

The implement frame shown in the accompanying drawings is particularly adapted for potato planters of the type shown in my aforesaid parent application but the present invention is not concerned with the details of the seed selecting and fertilizer distributing mechanism, that being disclosed and claimed in the aforesaid application. The single unit machine shown in Figure 1 includes a wheeled supporting frame I comprising two longitudinally extending channel members 2 and 3 having their ends bent at right angles and connected together by means of connecting blocks 4 and 5 disposed, respectively, at the rear and front ends of the implement, as best shown in Figure 1 which illustrates a single unit machine. The function of the connecting blocks 4 and 5 when employing a plurality of frame units to provide a multiple row machine will be referred to later. Intermediate the ends of the channel frame members 2 and 3, there is disposed a transverse frame member 5a which reinforces the frame and serves to connect the members 2 and 3. The frame is carried on an axle 6 which is journaled in bearings 7 and 8 suitably fixed to the two frame members 2 and 3, respectively. The ends of the axle 6 extend laterally outwardly to receive carrying wheels 9 and 10 journaled thereon. The wheels 9 and 10 serve as driving wheels for the machine and, to this end, are equipped with pawl and ratchet drive mechanisms 11 and 12 for operating the various parts of the planter mechanism.

Draft is applied to the planter by means of a pole 390 which is connected by bolts 391 at its rear end to channels 392 the rear ends of which are spaced apart laterally. Bolts 393 and blocks 394 serve to connect the rear ends of the channels 392 to the frame bars 2 and 3, as best shown in Figure 1. As shown in Figure 6, the blocks 394 have portions specially formed to fit between the flanges 2a on the bars 2 and 3 and against the channels 392.

The agricultural implement, so far as has been described, comprises a single row machine mounted on the frame I, which carries the operating mechanism. In some cases it is desirable to construct a multiple row machine capable of operating on or along more than one row, and, to this end, a feature of the frame construction embodying the principles of the present invention is that two single row units, including the frames I of each, can readily be connected together to form a two-row unit as is shown in Figures 2 to 5. The blocks 4 and 5 are shaped to engage in between the flanges 2a of the frame members 2 and 3 and have recesses 400 to receive the heads of the bolts 401 by which the blocks are connected to the two frame members 2 and 3. The blocks 4 and 5 are also formed to project outwardly beyond the flanges 2a on the frame members 2 and 3 and have beveled edges 403 to adapt them to be received between the flanges of a connecting transverse cross bar or channel member 404.

To construct a two-row machine from two one-row units, the two frames are connected together by means of a member 404 at each end. Holes 405 are provided in the blocks 4 and 5 and in the members 2 and 3 to receive bolts 406 for the purpose of rigidly fastening the members 404 in position. Because of the recesses 400, the bolts 401 need not be disturbed. A single through-axle 6a is substituted for the two individual axles of the two one-row units. By reason of the interengagement of the blocks 4 and 5 with the members 2 and 3 of the frame of the two units and with the transverse connecting members 404, a very rigid frame is provided and little or no bending stress is applied to the center of the axle 6a. A pole 410, somewhat longer than the pole 390 (Figure 1), is fastened between two angle irons 411 and 412 supported by a pair of brackets 413 and 414 from the transverse channel members 404. A seat 415 may also be supported from the rear member 404 by a bracket 416.

Thus, by reason of the provision and shape of the blocks 5 which form a part of each of the single unit frames 1, a rigid and sturdy double-unit frame is provided merely by securely fastening the two front and rear transverse members to the two unit frames.

While I have shown and described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A frame for agricultural machines of the convertible type and the like comprising a pair of generally longitudinally disposed frame channels having inwardly bent ends with outwardly extending flanges, and connecting blocks adapted to secure the inwardly bent ends together, said blocks being disposed on the outer faces of said frame channel ends and each having a beveled inwardly facing surface adapted to fit in between the outwardly extending flanges on the frame channel ends.

2. A frame for agricultural machines of the convertible type and the like comprising a pair of generally longitudinally disposed frame channels having inwardly bent ends, connecting blocks adapted to secure the inwardly bent ends together, said blocks each comprising outwardly beveled sections having bolt head receiving recesses, and bolt means having heads disposed in said recesses and adapted to secure the associated ends of said frame channels rigidly to said connecting block.

3. A frame for agricultural machines of the convertible type and the like comprising a pair of generally longitudinally disposed frame channels having inwardly bent ends and outwardly extending flanges, connecting blocks adapted to secure the inwardly bent ends together, said blocks each comprising inwardly and outwardly beveled sections, the inner beveled section of each block being adapted to be disposed between the outwardly extending flanges of the two frame channel ends which the block is adapted to connect, the outer beveled section having bolt head receiving recesses, and bolt means having heads disposed in said recesses and adapted to secure the associated ends of said frame channels rigidly to said connecting block.

4. A frame for agricultural machines of the convertible type and the like comprising a pair of generally longitudinally disposed frame channels having inwardly bent ends, connecting blocks adapted to secure the inwardly bent ends together, said blocks each comprising outwardly beveled sections having bolt head receiving recesses, bolt means having heads disposed in said recesses and adapted to secure the associated ends of said frame channels rigidly to said connecting block, and transversely disposed channel members at the front and rear ends of said frame members, each of said transversely disposed channel members having inwardly directed flanges adapted to fit against the outer beveled section of the associated connecting block with the web portion of said transverse channel member overlying the heads of the bolts by which said block is secured to the ends of said frame members.

5. A frame construction for a two-row agricultural machine comprising two substantially identical frame units, each including a pair of generally longitudinally disposed frame channels having inwardly bent ends and connecting blocks adapted to secure the inwardly bent ends together, said blocks being disposed on the outer faces of said frame channel ends, transversely disposed cross bars engaging the connecting blocks of said frame units at the front and rear ends thereof, and bolt means securing the connecting blocks and said cross bars to the inwardly bent ends of said frame channels.

6. A frame for agricultural machines of the convertible type and the like comprising a pair of generally longitudinally disposed frame members having inwardly bent ends and outwardly extending flanges, connecting blocks adapted to secure the inwardly bent ends together, said blocks each comprising inwardly and outwardly beveled sections, the inner beveled section of each block being adapted to be disposed between the outwardly extending flanges of the two frame member ends which the block is adapted to secure, the outer beveled section having bolt head receiving recesses, bolt means having heads disposed in said recesses and adapted to secure the associated ends of said frame members rigidly to said connecting block, transversely disposed channel members at the front and rear ends of said frame members, each of said transversely disposed channel members having inwardly directed flanges adapted to fit against the outer beveled section of the associated connecting block with the web portion of said transverse channel member overlying the heads of the bolts by which said block is secured to the ends of said frame members, and means for securing the end portions of each of said channel members to the ends of each of said blocks and the associated inwardly bent ends of each of said frame members.

7. A frame construction for a two-row agricultural machine comprising two substantially identical frame units, each including a pair of generally longitudinally disposed frame members having inwardly bent ends and outwardly extending flanges, connecting blocks adapted to secure the inwardly bent ends together, said blocks each comprising inwardly and outwardly beveled sections, the inner beveled section of each block being adapted to be disposed between the outwardly extending flanges of the two frame member ends which the block is adapted to secure, the outer beveled section having bolt head receiving recesses, and bolt means having heads disposed in said recesses and adapted to secure the associated ends of said frame members rigidly to said connecting block, transversely disposed channel members at the front and rear ends of said frame units, each of said transversely disposed channel members having inwardly directed flanges adapted to fit against the outer beveled section of each of the connecting blocks of the associated frame units with the web portion of said transverse channel member overlying the heads of the bolts by which said blocks are secured in place, and means for securing the end portions of each of said channel members to the ends of each of said blocks and the associated inwardly bent ends of each of said frame units.

8. A frame construction for a two-row agricultural machine comprising two substantially identical frame units, each including a pair of generally longitudinally disposed frame channels having inwardly bent ends and connecting blocks adapted to secure the inwardly bent ends together, said blocks being disposed on the outer faces of said frame channel ends, transversely disposed cross bars engaging the connecting blocks of said frame units at the front and rear ends thereof, means securing the connecting blocks and said cross bars to the inwardly bent ends of said frame channels, and draft pole means disposed substantially centrally of said frame units and connected with said front and rear cross bars.

9. A frame construction for a two-row agricultural machine comprising two substantially identical frame units, each including a pair of generally longitudinally disposed frame channels having inwardly bent ends and connecting blocks adapted to secure the inwardly bent ends together, said blocks being disposed on the outer faces of said frame channel ends, transversely disposed cross bars engaging the connecting blocks of said frame units at the front and rear ends thereof, means securing the connecting blocks and said cross bars to the inwardly bent ends of said frame channels with the frame units spaced apart laterally, a fore and aft extending draft member connected with said front and rear cross bars and disposed in the plane between the frame units, and a seat carried by the rear cross bar adjacent the rear end of said draft member.

10. A frame for agricultural machines of the convertible type and the like comprising a pair of generally longitudinally disposed frame channels having inwardly bent ends with outwardly extending flanges, and connecting blocks adapted to secure the inwardly bent ends together, said blocks being disposed on the outer faces of said frame channel ends and each having a beveled portion on each face, one serving to adapt each block to fit in between said outwardly extending flanges and the other face of each block serving as a generally fore and aft facing cross bar receiving section.

CURTISS L. COOK.